United States Patent

[11] 3,589,167

| [72] | Inventor | Harold I. Hill |
| | | Fairfield, Conn. |
| [21] | Appl. No. | 839,285 |
| [22] | Filed | July 7, 1969 |
| [45] | Patented | June 29, 1971 |
| [73] | Assignee | The Perkin-Elmer Corporation |
| | | Norwalk, Conn. |

[54] THERMOMECHANICAL ANALYSIS APPARATUS
10 Claims, 6 Drawing Figs.

[52] U.S. Cl. ................................................ 73/16, 336/136
[51] Int. Cl. ..................................................... G01n 25/16
[50] Field of Search .......................................... 73/16, 406; 33/73, 223; 336/136

[56] References Cited
UNITED STATES PATENTS

| 2,350,402 | 6/1944 | Krasnow et al. | 33/223 |
| 2,853,287 | 9/1958 | Draper et al. | 73/516 |
| 3,167,962 | 2/1965 | Scotto | 73/515 |
| 3,262,080 | 7/1966 | Hubbard | 33/223 |
| 3,276,123 | 10/1966 | Huggenberger | 33/1 |
| 3,474,658 | 10/1969 | Levy et al. | 73/16 |

Primary Examiner—James J. Gill
Assistant Examiner—Herbert Goldstein
Attorney—Edward R. Hyde, Jr.

ABSTRACT: A thermomechanical analysis apparatus is described which includes a probe assembly and means for supporting the assembly in substantially weightless contact with a sample material over a range of displacement of the probe. The support means comprises a reservoir of fluid and a body coupled to the probe assembly and positioned in the fluid for support thereof by fluid-buoyant forces acting on the body.

INVENTOR.
Harold I. Hill
BY
Frank J. Thompson
ATTORNEY.

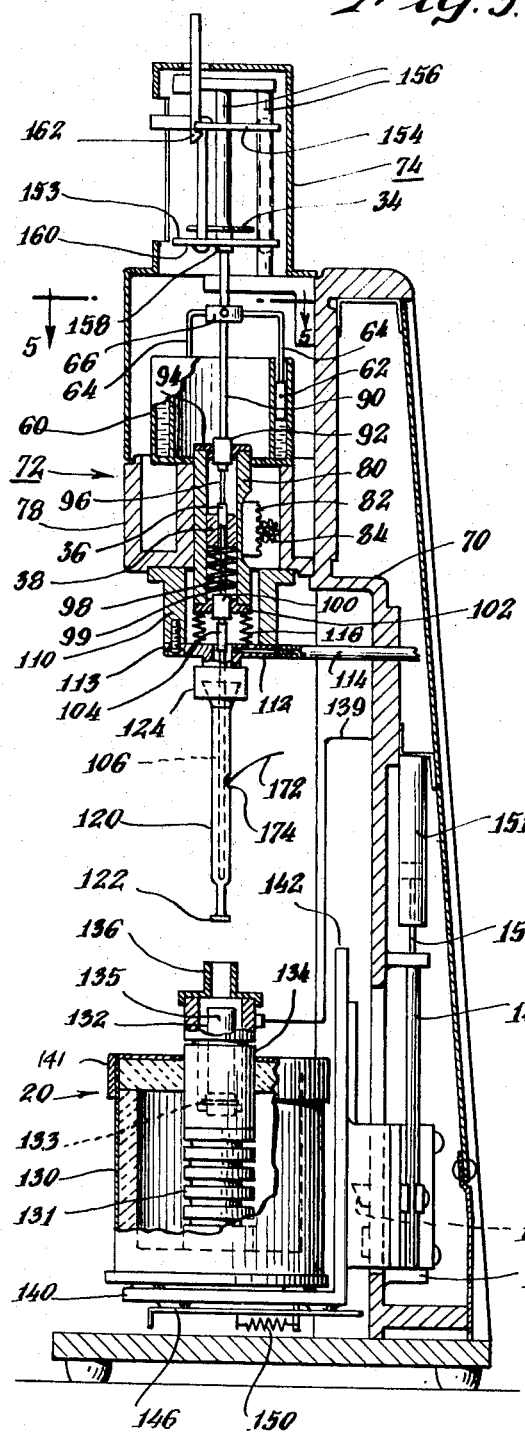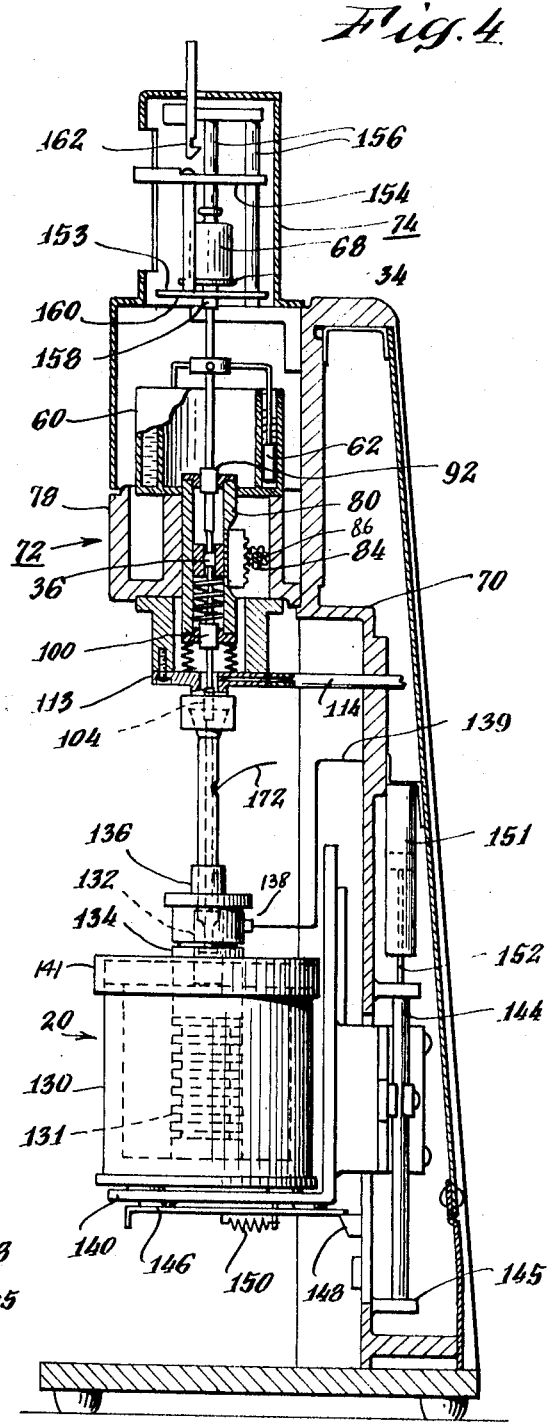

THERMOMECHANICAL ANALYSIS APPARATUS

This invention relates to analytical instruments. The invention relates more particularly to instruments for measuring thermomechanical properties of materials.

It is often desirable to accurately measure temperature dependent mechanical properties of materials such as the coefficient of expansion, softening point, heat distortion point, and heat shrink behavior. A knowledge of these properties is becoming increasingly important particularly with respect to plastic materials which are presently experiencing widespread use. These properties can be accurately determined in a known manner during a thermal energy exchange with the material by measurement of linear dimensional changes such as expansion or extension of a sample material and through the measurement of linear visco-elastic changes such as probe penetration of the sample material. Furthermore, other particular characteristics of a sample material which are determinable with enthalpic thermal analysis apparatus are measurable with greater sensitivity by sensing these dimensional and visco-elastic changes.

In a known apparatus for determining dimensional and visco-elastic changes, the tip of an elongated, vertically oriented probe is positioned in contact with a surface of a sample material in a temperature programmed environment. The probe tip then experiences a vertical displacement as one of the referred-to changes occurs in the material. A transducing member is supported on the probe for movement therewith and causes an output signal representative of the direction and magnitude of physical change in the sample material. This signal is applied to a recording means which is arranged for displaying the extent of the material change as a function of program temperature.

The linear dimensional changes occuring in a sample are relatively small, and accurate measurement with this apparatus requires that the probe tip exhibit apparent weightlessness to the sample during an expansion mode of measurement and exhibit a relatively low, known force on the sample during an extension and penetration mode of operation. A probe assembly support means has been provided which mechanically reduces the force of the probe tip on the sample through the use of a counterbalancing spring. However, this probe support means is effective to establish an apparent weightlessness for the assembly at one vertical location of the probe tip, and displacements from this location result in the application of an increasing force to the sample. The probe therefore influences the measurement, and accuracy of measurement is thereby reduced as the tip is displaced from this location.

Accordingly it is an object of the present invention to provide an improved thermomechanical analysis instrument.

Another object of the invention is to provide a thermomechanical analysis instrument having an improved arrangement for supporting a probe assembly of the apparatus.

Another object of the invention is to provide a thermomechanical analysis instrument having a probe assembly support means arranged for causing the probe tip to exhibit substantial weightlessness or a substantially constant force over a range of locations of the tip.

In accordance with features of the present invention, a thermomechanical analysis apparatus includes a probe assembly and means for supporting the assembly in substantially weightless contact with a sample material comprising a reservoir of fluid and a body coupled to the probe assembly and positioned in the fluid for support thereof by fluid-buoyant forces acting on the body. A particular embodiment of the invention includes a reservoir containing a liquid extending about a probe assembly and a floating body positioned in the reservoir and coupled to the probe assembly for support thereof.

These and other objects and features of the present invention will become apparent with reference to the following specifications and the drawings, wherein:

FIG. 3 is a sectional view of the thermomechanical analysis apparatus of FIG. 2 taken along line 3-3 and illustrating the apparatus in condition for receiving a sample;

FIG. 4 is another view of the apparatus of FIG. 3 illustrating the apparatus in condition for measurement;

Figure 1:
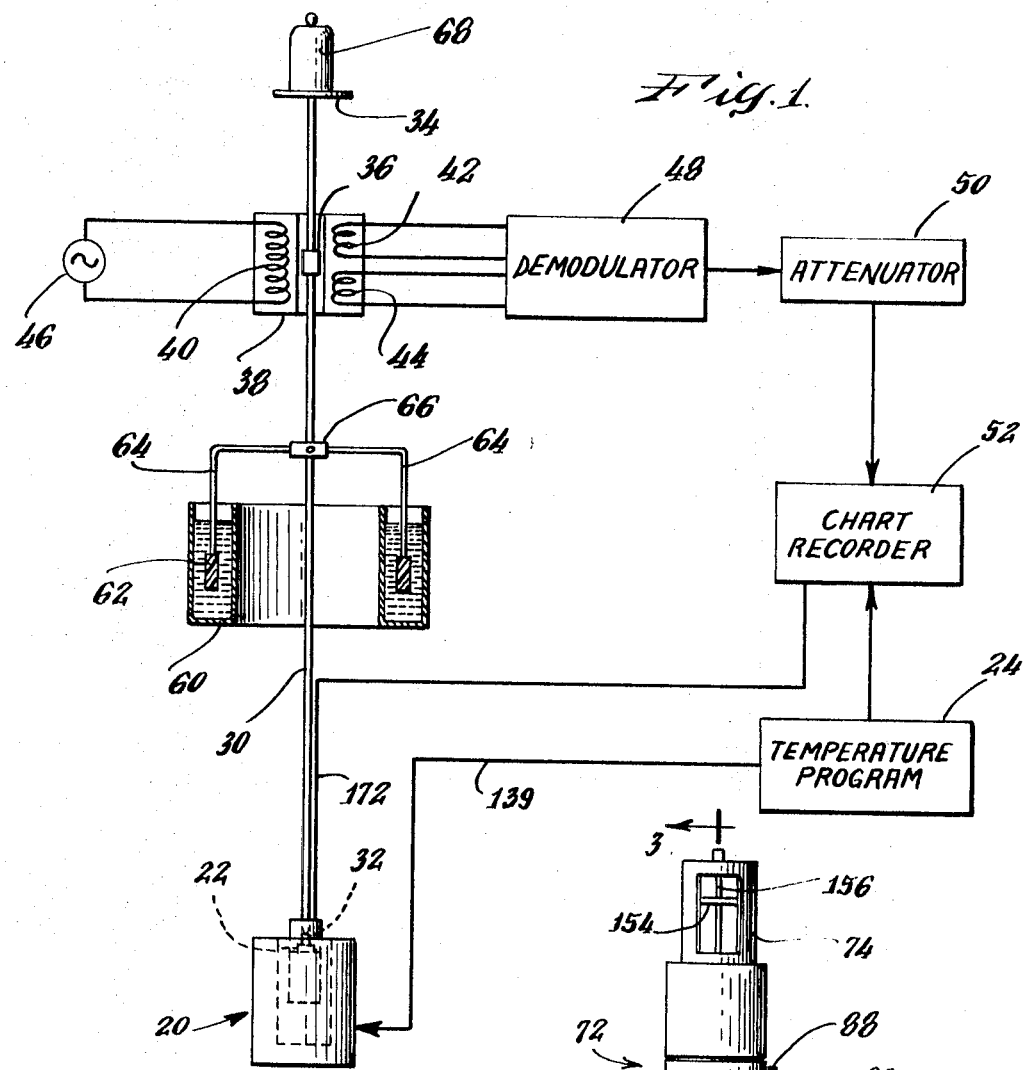
FIG. 1 is a schematic diagram partly in block form illustrating a thermomechanical apparatus constructed in accordance with features of this invention.
Figure 2:
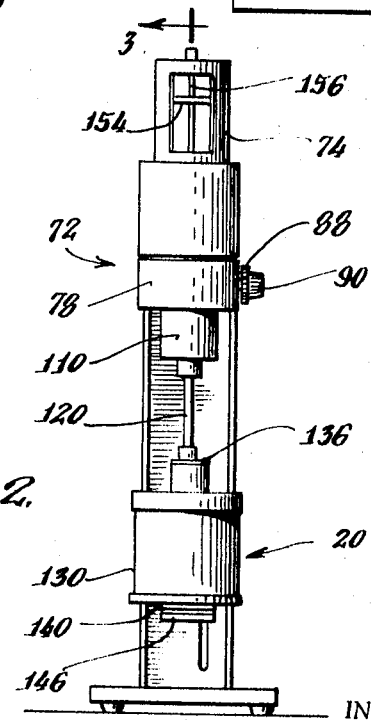
FIG. 2 is a front elevational view of an embodiment of the thermomechanical apparatus of the present invention.
Figure 5:
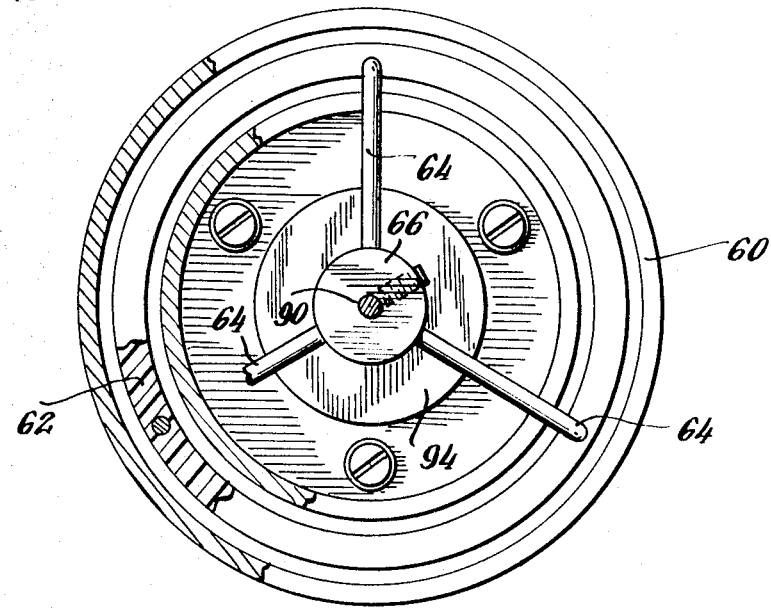
FIG. 5 is an elongated view taken along line 5-5 of FIG. 3 and illustrating a fluid-bouyant probe assembly support means of the present invention; and, FIG. 6 is an enlarged view of a lower end portion of a sample holder and probe of the apparatus of FIG. 2.

Referring now to FIG. 1, the thermomechanical apparatus of the present invention is shown schematically to include a means comprising a furnace and a Dewar flask assembly 20 for exchanging thermal energy with a sample material 22. The sample 22 which is positioned within a chamber of this assembly is cooled by the introduction of liquid nitrogen into the Dewar flask and alternatively the sample is heated by the application of electrical energy to the furnace. Electrical energy is applied to the furnace in a manner for causing the sample temperature to vary in accordance with a predetermined program. The source of electrical energy and program control is represented by the block 24. A particular arrangement of the energy source and program control is disclosed and claimed in copending U.S. Pat. application Ser. No. 839,276, filed July 7, 1969, which is assigned to the assignee of the present invention.

A probe assembly for sensing dimensional sample variations is provided. This assembly which is adapted for displacement in a vertical direction in accordance with dimensional variations occurring in the sample 22 includes an elongated rod 30 having a tip 32 positioned at one end thereof and maintained in contact with the sample material, a weight support platform 34 positioned at an opposite end thereof, and a transducer member 36 of ferromagnetic material supported at a point along the length of the rod. The transducer member 36 in one arrangement comprises a component of a conventional linear variable differential transformer. The transformer further includes a torroidal-shaped ferromagnetic core 38 positioned about the probe assembly and having a primary winding 40 and secondary windings 42 and 44 formed on the core. An alternating signal from a source 46 is applied to the primary winding 40 and, when the transducer member 36 is symmetrically positioned with respect to the secondary windings 42 and 44, then out-of-phase voltages will be generated in the secondary windings to provide a resultant null output signal. The magnitude and direction of displacement of the member 36 will cause corresponding output signals from the secondary windings having a combined resultant magnitude and polarity representative of the axial displacement of the member. A circuit means 48 including a demodulator combines and rectifies the resultant signal and provides an output DC signal which is coupled by an attenuator 50 to a chart recorder 52. An output signal from the temperature programming means 24 is also coupled to the chart recorder 52 along with a voltage provided by a thermocouple at the sample location.

In operation, the probe tip 32 will be displaced in a vertical direction in accordance with dimensional changes in the sample as the sample is temperature programmed and a corresponding output signal from the demodulator 48 representative of the magnitude and direction of displacement is applied to the chart recorder 52. The chart recorder will then plot along one axis the magnitude and direction of probe tip displacement and will indicate along another axis the programmed temperature. The various physical properties enumerated hereinbefore are then determinable from this recorded information.

It is desirable that the instrument probe assembly have little influence on the sample during analysis, and in particular should exhibit apparent weightlessness in an expansion mode of operation and a relatively low force in an elongation and visco-elastic mode of operation. This weightlessness or relatively low force should furthermore be maintained over the range of displacement of the tip 32 during measurement. In accordance with a feature of the present invention, these desired characteristics are provided by a probe assembly support means which exerts a fluid-buoyant force on the probe assembly over the range of tip displacements. In FIG. 1 this means is shown to comprise a reservoir 60 which has an annular shape and extends about the probe rod 30. An annular float body 62 is positioned in the liquid reservoir and includes support members 64 which extend from the body 62 to a collar 66 which is attached to the probe rod 30. The density of the liquid is selected to be greater than the density of the float body 62 and the float is caused to submerge in the liquid by the application of a force provided by a weight 68 positioned on the weight tray 34. The dimensions of the float body in the reservoir along with the particular liquid and float body materials are selected to cause the float body 62 to float partially submerged. When the float body is partially submerged the probe assembly exhibits a negative gravimetric weight to a sample under analysis. The application of increasing weights 68 to the tray 34 causes the probe assembly to then exhibit zero and positive gravimetric weights to a sample under analysis. The buoyant forces acting on a fully submerged float body and supporting the probe assembly and the weights on the tray 34 will be maintained substantially constant as the tip 32 is displaced vertically during measurement in accordance with dimensional changes in the sample. Accordingly, a substantially constant weightlessness of the probe assembly or a substantially constant force on the sample over a range of probe displacements is provided by selection of the weight 68. The accuracy of analysis is thereby enhanced.

Reference is now made to FIGS. 2 through 6 for a detailed description of an embodiment of a thermomechanical analysis apparatus of the present invention. Those elements of the apparatus of FIGS. 2 through 6 which perform the same or similar functions as elements of FIG. 1 bear the same reference numerals. In FIGS. 3 and 4 the apparatus is shown to include a frame 70 which supports a stationary probe assembly guide indicated generally as 72, a means for restricting the vertical motion of the probe assembly indicated generally as 74, and a vertically adjustable Dewar flask and furnace assembly 20. The guide assembly 72 includes an annular-shaped housing 78 having a cylindrical bore centrally located therein and a transducer transport body 80 adapted for vertical positioning within the bore. The transducer core 38 is located within the transport body 80 and is adjustable therewith in a vertical direction through the action of a rack and pinion drive. A rack gear 82 is secured to the body 80 and a pinion gear 84 engages the rack and includes a shaft 86 (FIG. 4) which is coupled to a rotatable control knob 88 (FIG. 2) having a vernier 90 coupled thereto. A coarse vertical adjustment for nulling the output of the transducer by positioning the secondary windings symmetrically with respect to the member 36 is provided by rotation of the knob 88, while the fine adjustment is accomplished by rotation of the vernier 90.

Figure 6:
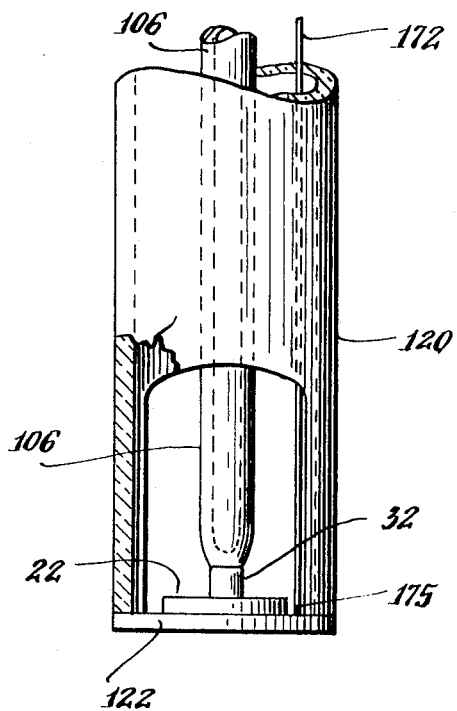

The probe assembly rod 30 of FIG. 1 is represented in FIGS. 3 and 4 by a first hardened Teflon coated aluminum rod member 90 which extends through a ball bearing guide 92 mounted on a plate 94. This plate is secured to an upper surface of the transport body 80. The probe rod further includes a relatively narrow member 96 formed of a nonmagnetic material such as 300 series stainless steel which is secured to the rod member 90 and extends into a second lower hardened Teflon coated aluminum rod member 98, The ferromagnetic transducer core 36 is secured to the nonmagnetic rod member 96 for displacement in a vertical direction within the transducer core 38. The rod member 98 extends through a second roller bearing 100 which is supported by a plate 102. This plate is secured to a lower surface of the transport body 80. A helical spring 99 spaces the torroidal core 38 from this lower bearing plate. The rod member 98 is screw threaded to a coupling collar 104. The probe assembly further includes a quartz tube 106 which is secured to a lower portion of the collar 104 and which terminates at a lower end thereof in a probe tip (FIG. 6).

A lower portion of the probe guide assembly 72 includes a bellows housing member 110 which is secured to the body 78. A sample holder support body 113 is secured to the lower surface of member 110 and includes a channel 112 communicating with an inner core and with an externally located tubulation 114. A bellows 116 is secured between an upper surface of the sample holder support body 113 and a lower surface of the bearing plate 102 and provides for a gastight flow passage between these bodies. A sample holder tube 120 surrounds the quartz probe 106. This tube includes an upper flanged end which is secured by a screwcap 124 to a lower extension of the body 113 in communication with a bore located therein. A gasket, not illustrated, forms a gastight seal between the flanged end and this extension. The sample holder tube includes a sample support surface 122 at a lower end thereof (FIG. 6). Probe tube 106 extends through this tube and the integral solid quartz tip 32 is brought into physical contact with the sample. The channel 112, (FIG. 3) the bore of the body 113, and the bellows 116 provide for a gas flow path for a purging gas which is coupled to the tubulation 114. The purging gas will flow between the glass sample support tubulation 120 and the probe tube 106 toward the sample 22 and exhaust at a lower end of the sample holder 120. A thermocouple lead 172 extends through an aperture 174 in the side of the sample holder tube 120 and extends to the lower surface 122 where a juncture tip 175 of the thermocouple is positioned for sensing sample temperature.

The fluid-buoyant support means includes the annular reservoir 60 which is secured to the body 78, the annular float body 62, a liquid contained within a reservoir 60, the probe assembly support members 64 and the collar 66 for securing these members to the shaft 90. In a particular arrangement the buoyant liquid comprises fluorocarbon oil, while the float body is formed of polypropylene. The apparatus of FIGS. 2, 3 and 4 thus far described provides for the buoyant support of the probe assembly, the null adjustment of the transducer output, the support of the sample material under analysis, and the flow of a purging gas through the sample holder and over the sample.

The Dewar flask-furnace assembly 20 includes an insulated Dewar flask 130 having a metallic heat conductive cylinder 131 located centrally therein and supporting an aluminum furnace 132 which is positioned on a heat insulating body 133 in an aluminum heat sink 134. The furnace is heated by the application of electrical energy thereto through heater coils formed about the outer furnace body. A particularly advantageous furnace heater and sensor arrangement for use in this apparatus is described in the referred-to copending U.S. patent application. The furnace defines a chamber 135 into which the sample holder tube 120 and probe assembly extends and terminates near a lower portion thereof. An asbestos collar 136 is positioned on top of the furnace for reducing heat flow from the furnace. As indicated hereinbefore, electrical energy is applied to the furnace in a programmed manner at terminal 138 via leads 139 from the temperature program and heater current source 24. A pair of semicircular caps 141 are positioned on the Dewar flask about the furnace body for reducing heat transfer from the reservoir of the Dewar flask when a coolant such as liquid nitrogen is placed in the flask. Thermal transfer between the sample within the furnace chamber and the liquid coolant is provided through the cylinder 131, the heat sink 134, and the aluminum furnace 132.

The sample holder 120 is rigidly secured to the assembly 72 and a sample is introduced and removed from this holder and introduced and removed from the furnace chamber by vertically positioning and repositioning the furnace and Dewar flask assembly 20. The flask 130 is mounted on a support base 140 which forms an integral portion of a transport including a guide segment 142 positioned at right angles to the base 140 and transportable along a guide track 144. The flask in FIG. 3 is shown positioned at a lower position at which position the lower portion of the sample holder 120 is accessible for introduction and withdrawal of a sample material. The Dewar flask transport is supported in the position shown in FIG. 3 by a bumper stop 145. In the alternate operating position of FIG. 4, the transport is secured in position by a latch 146 which is forced into contact with a catch 148 by a spring 150. The Dewar flask furnace assembly represents a considerable weight and in order to avoid rapidly dropping the base 140, a dashpot 151 having a coupling arm 152 thereof coupled to the transportable flask assembly is provided.

The probe assembly restricting means 74 includes a vertically transportable table 153 which is secured to an upper flat member 154, both of which include apertures aligned with guidebars 156. The table 153 includes an aperture through which a collar 158 of the probe assembly weight support table 34 extends. This collar is secured to the shaft 90 and the table is movable therewith. In its operating position, the weight table 34 is positioned substantially as illustrated in FIG. 4. When introducing and removing a sample from the sample holder 120 it is desirable to withdraw the probe assembly in order to facilitate access to the sample holder. By lifting the table 153 at an edge 160 thereof, the instrument operator will then engage the lower surface of the table 34 and cause the entire probe assembly to rise vertically by an amount sufficient for a notch in a latch 162 to engage the upper member 154. The probe assembly is then restrained as shown in FIG. 3 in a withdrawn position until the latch 162 is released by the instrument operator.

An improved thermomechanical analysis apparatus has thus been described which advantageously provides for a probe assembly which exhibits substantially constant weightlessness and exhibits a constant predetermined relatively low force on a sample over a range of displacements of a probe tip. The influence of the probe assembly on the characteristics of the sample at various temperatures are thereby reduced and the accuracy of the analysis is accordingly enhanced.

While I have illustrated and described a particular embodiment of my invention, it will be understood that various modifications may be made therein without departing from the spirit of the invention and the scope of the appended claims.

I claim:

1. In an apparatus for analyzing a sample material of the type wherein a surface of the material is subject to physical movement when a characteristic of the material varies, said apparatus having means including a vertically displaceable probe positioned in contact with the sample surface and movable with the surface for sensing and indicating variations in a characteristic of the sample, an improved means for supporting the probe at the sample surface and for exerting a substantially constant force on the sample throughout a range of displacement of the probe during analysis comprising a reservoir containing a fluid, a float body submerged in the fluid, a probe sensing means positioned outside of said fluid, and means coupling said float body to said probe sensing means for supporting the probe sensing means in contact with said sample surface by fluid- buoyant forces acting on said body.

2. In a thermomechanical analysis apparatus having a sample material support means, means for varying the temperature of the sample material over a range of temperatures, and probe sensing means including a vertically displaceable probe positioned in contact with said sample material for providing an indication of variations in the physical dimensions of said sample as the temperature of the sample is varied, the improvement for supporting the probe in contact with said sample and providing a substantially constant force on the sample over a range of displacements of said probe during analysis comprising a reservoir containing a fluid, means for mounting said reservoir in a stationary position near said probe, a float body submerged in the fluid, means coupling said float body to said probe for supporting the probe in contact with said sample material by fluid-buoyant force acting on the float body, and adjustable means for establishing said force on said sample material.

3. The apparatus of claim 2 wherein said fluid comprises a liquid and said reservoir comprises an annular body extending about said probe.

4. The apparatus of claim 3 wherein said float body comprises an annular body positioned in said reservoir.

5. The apparatus of claim 2 wherein said adjustable means establishes a force on said sample substantially equal to a weightless condition for said probe.

6. The apparatus of claim 2 wherein said adjustable means established a force on said sample greater than zero.

7. In a thermomechanical analysis apparatus having a sample material support means, means for varying the temperature of the sample material over a range of temperatures, and probe sensing means including a vertically displaceable probe adapted to be supported in contact with said sample material for providing an indication of variations in the physical dimensions of said sample as the temperature of the sample is varied, the improvement for supporting the probe in contact with said sample and for causing the probe to exert a substantially constant force on the sample over a range of displacements of said probe during analysis comprising an annular-shaped reservoir mounted in a fixed position with respect to the probe and extending about the probe, said reservoir containing a liquid, a float body positioned in the liquid, said float body having a volume and density with relation to said liquid for supporting said probe out of contact with the sample material under analysis when the float is partially submerged in said fluid, and loading means coupled to said probe for adjustably increasing the effective weight of said probe for causing the float body to submerge in said fluid and to contact said sample material and exert a desired force on said material.

8. The apparatus of claim 7, wherein said means for submerging said float body comprises a platform coupled to said probe and adapted for receiving weights for controlling the extent of submersion of said body.

9. The apparatus of claim 7 wherein said reservoir comprises a torroidally shaped body having an aperture centrally located therein through which said probe extends and said float body comprises a torroidally shaped body positioned in said reservoir.

10. The apparatus of claim 9 wherein said probe is vertically oriented said means for coupling said float body to said probe includes at least one member secured to said float body and extending vertically upward away from said float body and toward said probe.